US011918994B2

(12) United States Patent
Matsumura et al.

(10) Patent No.: US 11,918,994 B2
(45) Date of Patent: Mar. 5, 2024

(54) SAFETY CABINET

(71) Applicant: Hitachi Industrial Equipment Systems Co., Ltd., Tokyo (JP)

(72) Inventors: Takeshi Matsumura, Tainai (JP); Takeshi Kaneko, Tainai (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 245 days.

(21) Appl. No.: 17/595,592

(22) PCT Filed: Apr. 27, 2020

(86) PCT No.: PCT/JP2020/017926

§ 371 (c)(1),
(2) Date: Nov. 19, 2021

(87) PCT Pub. No.: WO2021/005869

PCT Pub. Date: Jan. 14, 2021

(65) Prior Publication Data

US 2022/0234038 A1 Jul. 28, 2022

(30) Foreign Application Priority Data

Jul. 10, 2019 (JP) ................................ 2019-128745

(51) Int. Cl.
*B01L 1/02* (2006.01)
*B01L 1/04* (2006.01)
(Continued)

(52) U.S. Cl.
CPC .................. *B01L 1/02* (2013.01); *B01L 1/04* (2013.01); *B08B 15/023* (2013.01); *F21S 4/28* (2016.01);
(Continued)

(58) Field of Classification Search
None
See application file for complete search history.

(56) References Cited

U.S. PATENT DOCUMENTS 3,811,250 A * 5/1974 Fowler, Jr. ............ B01D 46/00 454/56
4,624,690 A * 11/1986 Byrnes ................. B08B 15/023 15/316.1

(Continued)

FOREIGN PATENT DOCUMENTS

CN 1576738 A 2/2005
JP 2009-119391 A 6/2009

(Continued)

OTHER PUBLICATIONS

International Search Report (PCT/ISA/210) issued in PCT Application No. PCT/JP2020/017926 dated Jul. 14, 2020 with English translation (four (4) pages).

(Continued)

*Primary Examiner* — Joseph A Dillon, Jr.
(74) *Attorney, Agent, or Firm* — Crowell & Moring LLP

(57) ABSTRACT

Sample contamination is suppressed by strengthening the air barrier of a work opening portion. A safety cabinet includes: a work room; a front surface door covering a part of a front opening portion of the work room; and a work opening portion on a lower side of the front surface door allowing a worker to work with his or her hand in. An intake port suctions air in the work room and outside air through the work opening portion on a front surface side of a workbench in a lower portion of the work room. A straightening plate drawing an air flow and a linear light source are provided on the work room side of the front surface door and above a front portion of the work room.

9 Claims, 9 Drawing Sheets

(51) Int. Cl.
*B08B 15/02* (2006.01)
*F21S 4/28* (2016.01)
*F21Y 103/10* (2016.01)
*F21Y 115/10* (2016.01)

(52) U.S. Cl.
CPC ... *B01L 2200/082* (2013.01); *B01L 2200/141* (2013.01); *B01L 2300/0681* (2013.01); *F21Y 2103/10* (2016.08); *F21Y 2115/10* (2016.08)

(56) References Cited

U.S. PATENT DOCUMENTS

| | | | | | |
|---|---|---|---|---|---|
| 4,723,480 | A * | 2/1988 | Yagi | F24F 3/163 454/60 |
| 5,487,768 | A * | 1/1996 | Zytka | B01D 46/0039 55/385.2 |
| 5,792,435 | A * | 8/1998 | Mueller | A61L 2/24 422/302 |
| 6,615,679 | B1 * | 9/2003 | Knollenberg | G01N 1/2247 73/28.01 |
| 6,878,177 | B2 * | 4/2005 | Lohr | B01D 46/0036 422/123 |
| 7,090,709 | B2 * | 8/2006 | Ono | B08B 15/023 55/385.2 |
| 7,323,026 | B2 * | 1/2008 | Ono | B01L 1/04 55/482 |
| 10,357,810 | B2 * | 7/2019 | Ruan | F24F 13/08 |
| 10,493,506 | B2 * | 12/2019 | Kim | F24F 7/065 |
| 10,525,458 | B2 * | 1/2020 | Ono | F24F 3/163 |
| 10,864,514 | B2 * | 12/2020 | Oguma | B08B 15/023 |
| 10,926,266 | B2 * | 2/2021 | Berberich | B08B 15/023 |
| 11,534,749 | B2 * | 12/2022 | Kaneko | F24F 7/06 |
| 11,543,139 | B2 * | 1/2023 | Kaneko | F24F 11/52 |
| 11,554,395 | B2 * | 1/2023 | Kaneko | F24F 7/06 |
| 11,559,813 | B2 * | 1/2023 | Souma | B01L 7/04 |
| 11,666,899 | B2 * | 6/2023 | Kaneko | F24F 7/06 55/385.2 |
| 2005/0048899 | A1 | 3/2005 | Anezaki et al. | |
| 2005/0245188 | A1 * | 11/2005 | Wu | F24F 3/163 454/49 |
| 2008/0150404 | A1 * | 6/2008 | Ono | A47B 81/00 312/209 |
| 2013/0061567 | A1 | 3/2013 | Kawasaki et al. | |
| 2015/0056909 | A1 * | 2/2015 | Chien | F24F 11/30 454/187 |
| 2017/0120233 | A1 * | 5/2017 | Rindoks | B01L 1/00 |
| 2017/0232434 | A1 * | 8/2017 | Goto | F24F 7/06 422/565 |
| 2018/0001315 | A1 | 1/2018 | Kaneko et al. | |
| 2018/0161835 | A1 * | 6/2018 | Liebsch | B08B 15/023 |
| 2018/0214861 | A1 * | 8/2018 | Ono | B01L 1/04 |
| 2019/0134683 | A1 * | 5/2019 | Ono | F24F 7/06 |
| 2019/0310177 | A1 * | 10/2019 | Ono | G01N 33/0009 |
| 2021/0001324 | A1 * | 1/2021 | Kaneko | F24F 3/163 |
| 2022/0008969 | A1 * | 1/2022 | McKibben | B08B 15/00 |
| 2022/0097036 | A1 * | 3/2022 | Kaneko | F24F 8/108 |
| 2022/0184597 | A1 * | 6/2022 | Kaneko | C12M 37/00 |
| 2022/0212355 | A1 * | 7/2022 | Kaneko | B01L 1/00 |

FOREIGN PATENT DOCUMENTS

| | | | |
|---|---|---|---|
| JP | 2012-7768 | A | 1/2012 |
| JP | 2019-817 | A | 1/2019 |
| WO | WO 2007/111143 | A1 | 10/2007 |
| WO | WO 2016/143228 | A1 | 9/2016 |

OTHER PUBLICATIONS

Japanese-language Written Opinion (PCT/ISA/237) issued in PCT Application No. PCT/JP2020/017926 dated Jul. 14, 2020 (four (4) pages).

Chinese-language Office Action issued in Chinese Application No. 202080037857.4 dated Aug. 2, 2022 with English translation (18 pages).

* cited by examiner

SAFETY CABINET

TECHNICAL FIELD

The present invention relates to a safety cabinet used for regenerative medical treatment such as cell preparation and research on pathogens or the like.

BACKGROUND ART

Isolators and safety cabinets are used in handling cells and microorganisms during, for example, pathogen research and regenerative medical treatment.

In a safety cabinet as an open system (class II cabinet for biohazard countermeasures), clean air is supplied to the work room in the apparatus from the upper blowout portion of the work room with dust, pathogens, and so on filtered with a HEPA filter or the like. Then, the air in the room where the safety cabinet is disposed is suctioned, together with the air in the work room, through the work opening portion in the front of the work room from the intake port in the front of the workbench that is the lower surface of the work room. As a result, an inlet airstream is generated in the work opening portion. In addition, when the suctioned air is exhausted to the outside of the safety cabinet, the air containing pathogens and so on is filtered with an exhaust HEPA filter or the like. The HEPA filter is an abbreviation for a high efficiency particulate air filter. The inlet airstream generated in the work opening portion prevents the pathogens and so on handled in the work room from leaking out of the safety cabinet, infecting a worker, and spreading to the environment. Patent Document 1 illustrates a safety cabinet as an example.

CITATION LIST

Patent Document

Patent Document 1: JP 2009-119391 A

SUMMARY OF THE INVENTION

Problems to be Solved by the Invention

Work in the safety cabinet is performed with a hand in from the work opening portion below the front surface door of the cabinet, and thus workability is satisfactory. However, depending on how the work is done or how the equipment is handled, the inside of the work room may be mixed with the general air outside the equipment or the sample handled in the equipment may leak out of the work room.

An object of the present invention is to suppress sample contamination by strengthening the air barrier of a work opening portion.

Solutions to Problems

An example of "safety cabinet" of the present invention for solving the above problems includes: a work room; a front surface door covering a part of a front opening portion of the work room; a work opening portion on a lower side of the front surface door allowing a worker to work with his or her hand in; and an intake port suctioning air in the work room and outside air through the work opening portion on a front surface side of a workbench in a lower portion of the work room, in which a straightening plate drawing an air flow is provided on the work room side of the front surface door and above a front portion of the work room.

Effects of the Invention

According to the present invention, it is possible to provide a safety cabinet capable of suppressing sample contamination by strengthening the air barrier of a work opening portion.

Tasks, configurations, and effects other than those described above are apparent from the description of the following embodiments.

MODE FOR CARRYING OUT THE INVENTION

Figure 1:
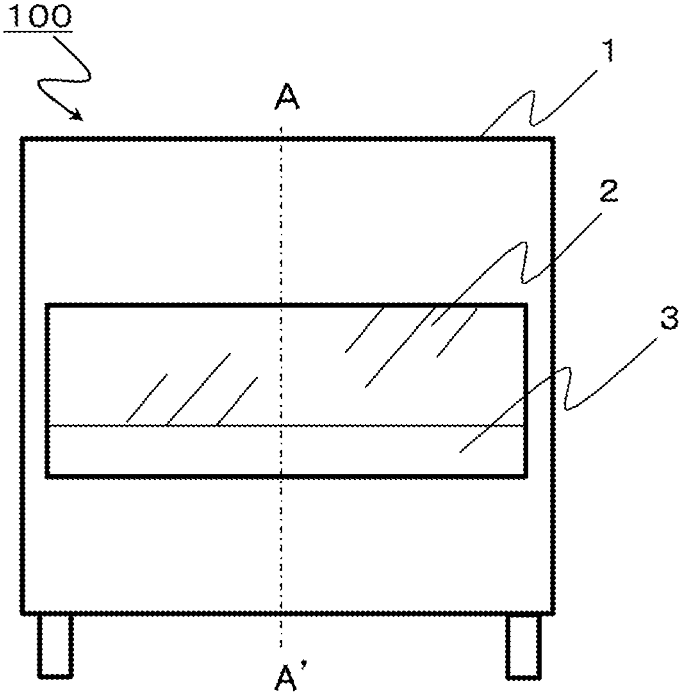
FIG. 1 is an external front view illustrating a safety cabinet of a first embodiment.

Embodiments of the present invention will be described with reference to the drawings. It should be noted that the same constituent element in the drawings for describing the embodiments is given the same name and reference numeral to the maximum extent possible with redundant description omitted.

First Embodiment

Figure 2:
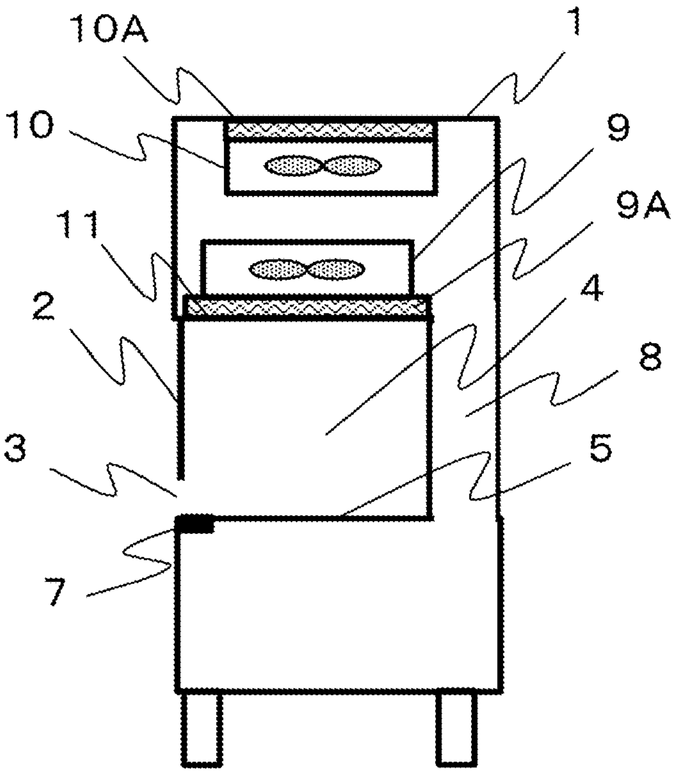
FIG. 2 is a side cross-sectional view illustrating the safety cabinet of the first embodiment.

FIG. 1 illustrates a schematic front view of a safety cabinet. In addition, FIG. 2 illustrates a side cross-sectional view of the safety cabinet in which the A-A' cross section of FIG. 1 is viewed from the right.

An opening is provided in the middle region of a housing 1 of a safety cabinet 100, and a work room 4 is provided behind the opening. A front surface door 2 is provided on the front surface side of the work room 4 so as to block the upper portion of the opening, a work opening portion 3 is provided on the lower side of the front surface door 2, and a worker performs work with his or her hand in the work room 4 from the work opening portion 3. The front surface door 2 is formed of a transparent material such as glass, and the worker can visually check the work through the front surface door 2.

A substantially flat workbench 5 is provided on the bottom surface of the work room 4, and the worker performs the work on the workbench. A front intake port 7 leading downward is provided on the front side of the workbench 5 and near the work opening portion 3. The front intake port 7 is formed of, for example, a slit extending in the left-right direction of the housing along the work opening portion 3.

Provided on the back surface side of the work room 4 is a back flow path 8 leading from the front intake port 7 to the upper portion of the housing.

A circulation fan filter unit (FFU) 9 is provided on the upper side of the work room 4. The circulation FFU 9 is configured by a fan rotated by a motor and a fine particle removal filter such as a circulation HEPA filter 9A, and clean air is blown out to the work room 4 through a punching plate 11 with fine particles removed. An exhaust fan filter unit (FFU) 10 is provided in the upper portion of the housing 1, and some of the air is discharged to the outside of the apparatus through a filter such as an exhaust HEPA filter 10A with the fine particles removed.

Figure 3:
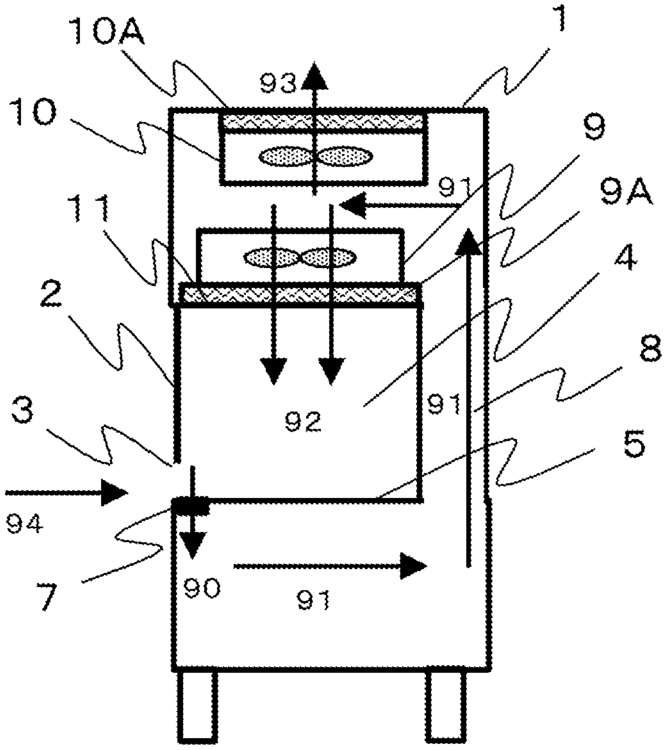
FIG. 3 is a diagram illustrating the flow of air during the operation of the safety cabinet of FIG. 2.

FIG. 3 illustrates the flow of air during the operation of the safety cabinet with arrows. Air 90 suctioned from the front intake port 7 on the front surface side of the workbench 5 is blown from the circulation FFU 9 to the work room 4 through the lower portion of the housing, the back flow path 8, and the upper portion of the housing as indicated by reference numeral 91. Clean air is blown to the work room 4 with fine particles removed by the circulation HEPA filter 9A of the circulation FFU 9. As a result, the work room 4 is maintained in a clean state. At this time, the air in the work room may leak to the outside with only the air flow to the work room 4 indicated by reference numeral 92. Accordingly, the exhaust FFU 10 is provided and some of the air is released to the outside through the exhaust HEPA filter 10A. As a result, the pressure of the work room decreases and an air flow 94 to be introduced from the outside to the inside through the work opening portion 3 below the front surface door 2 is generated. The cleanliness of the work room will decline if this air flow 94 flows into the work room as it is. However, by appropriately controlling the air volume of the flow 92 of the air blown from the circulation FFU 9 to the work room and the air volume of a flow 93 of the air discharged from the exhaust FFU 10 to the outside, the entire air 94 flowing in from the work opening portion 3 and most of the air 92 sent to the work room are suctioned from the front intake port 7 and the flow 92 of the air blown out to the work room 4 forms an atmospheric wall (air barrier) blocking the inflow of the air 94 from the work opening portion 3 into the work room 4. As a result, an equilibrium state can be realized where the air from the outside does not contaminate the work room 4 and the internal pre-cleaning air does not leak to the outside.

The worker performs the work using the safety cabinet with his or her hand in the work room 4 through the work opening portion 3, and thus the worker may become a source of contamination of the work room that is a clean and sterile environment. Accordingly, the air barrier near the work opening portion needs to be strengthened. In addition, work room lighting is necessary so that the work situation in the work room is checked by the worker.

Figure 4A:
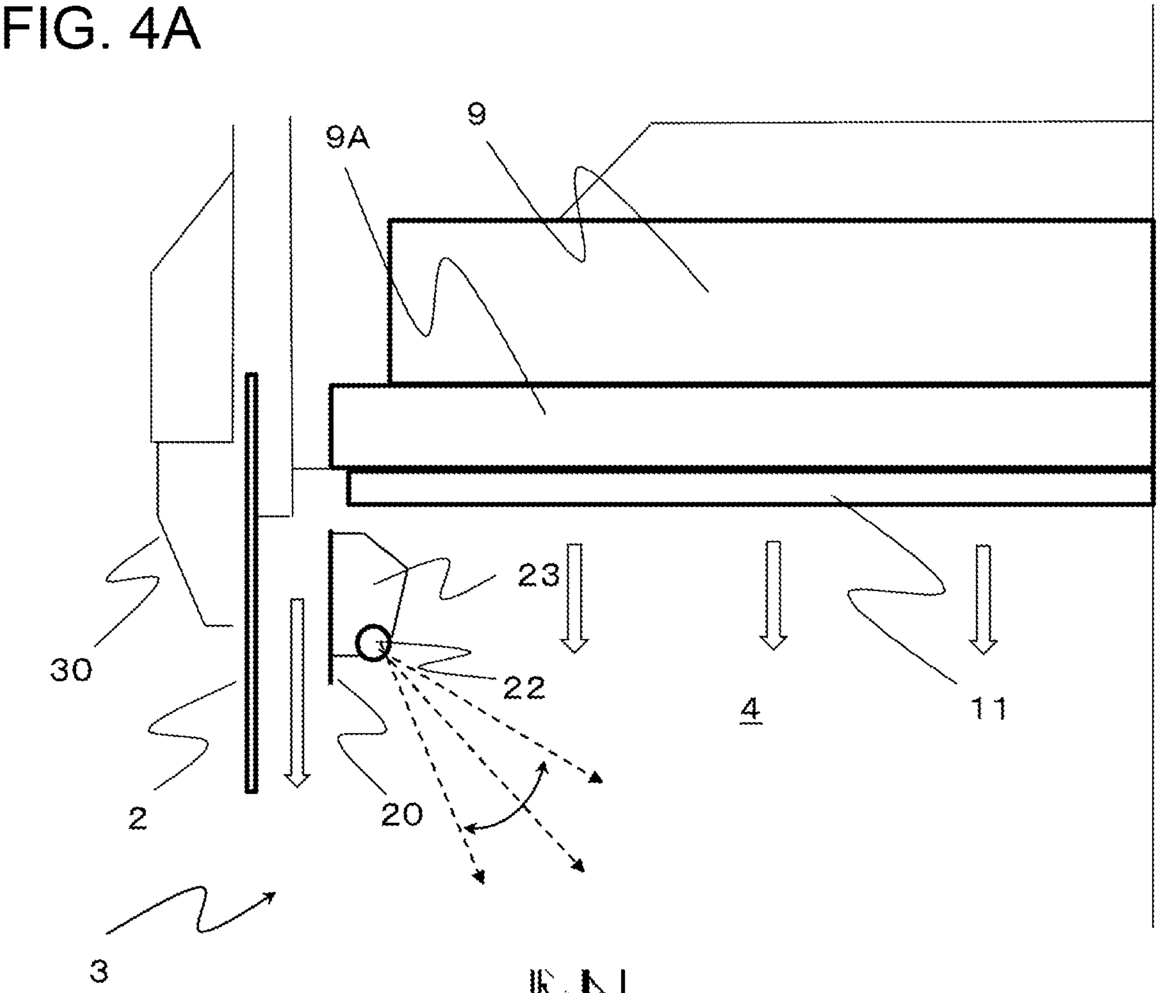
FIGS. 4A and 4B are enlarged views illustrating a part of the safety cabinet of the first embodiment.
Figure 4B:
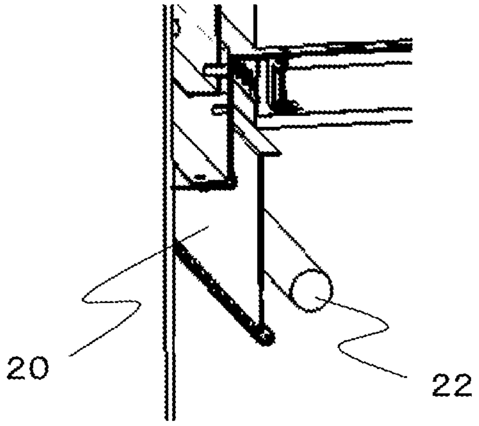

FIG. 4 illustrates an example of the safety cabinet of a first embodiment of the present invention, FIG. 4(*a*) is a cross-sectional view of the vicinity of the front portion of the work room, and FIG. 4(*b*) is a perspective view thereof.

In the drawings, a straightening plate 20 is provided in the work room on the back side of the front surface door 2. The straightening plate 20 is provided in the up-down direction, parallel to the front surface door 2, and provided at a predetermined distance from the front surface door 2. The straightening plate 20 is made of one plate and provided above the front portion of the work room 4 so as to connect the left and right side walls of the work room. A lighting mounting seat 23 where a linear light source is mounted is mounted on both sides of the straightening plate and both side walls of the work room. Further, a linear light source 22 such as a straight tube-type LED lighting lamp is mounted on the lighting mounting seat 23. In other words, the linear light source 22 is mounted above the front portion of the work room 4 across the left and right side walls.

Although air is blown from above to the work room 4 by the circulation FFU 9, the air flow is drawn toward the straightening plate 20 and the flow velocity increases (Coanda effect) in the presence of the straightening plate 20. Accordingly, the air barrier on the back side of the front surface door 2 is strengthened, the inflow of outside air from the work opening portion 3 into the work room 4 can be blocked, and sample contamination in the work room can be prevented.

In addition, by mounting the linear light source 22 above the front portion of the work room, the work room is illuminated from the front and the worker can clearly check the work situation in the work room. Although the linear light source 22 may be a straight tube-type fluorescent lamp, an LED light source has directivity, and thus a necessary place such as the middle portion of the workbench can be brightly illuminated as indicated by the arrows in FIG. 4(*a*) using an LED lighting lamp. In addition, although the straightening plate 20 and the lighting mounting seat 23 may be separate bodies, the mounting is facilitated by integration.

According to the present embodiment, the straightening plate is provided on the work room side of the front surface door and above the front portion of the work room. Accordingly, the air barrier on the back side of the front surface door is strengthened, the inflow of outside air from the work opening portion into the work room can be blocked, and sample contamination in the work room can be prevented. In addition, by mounting the linear light source above the front portion of the work room, the work room is illuminated from the front and the worker can clearly check the work situation in the work room.

Second Embodiment

Figure 5A:
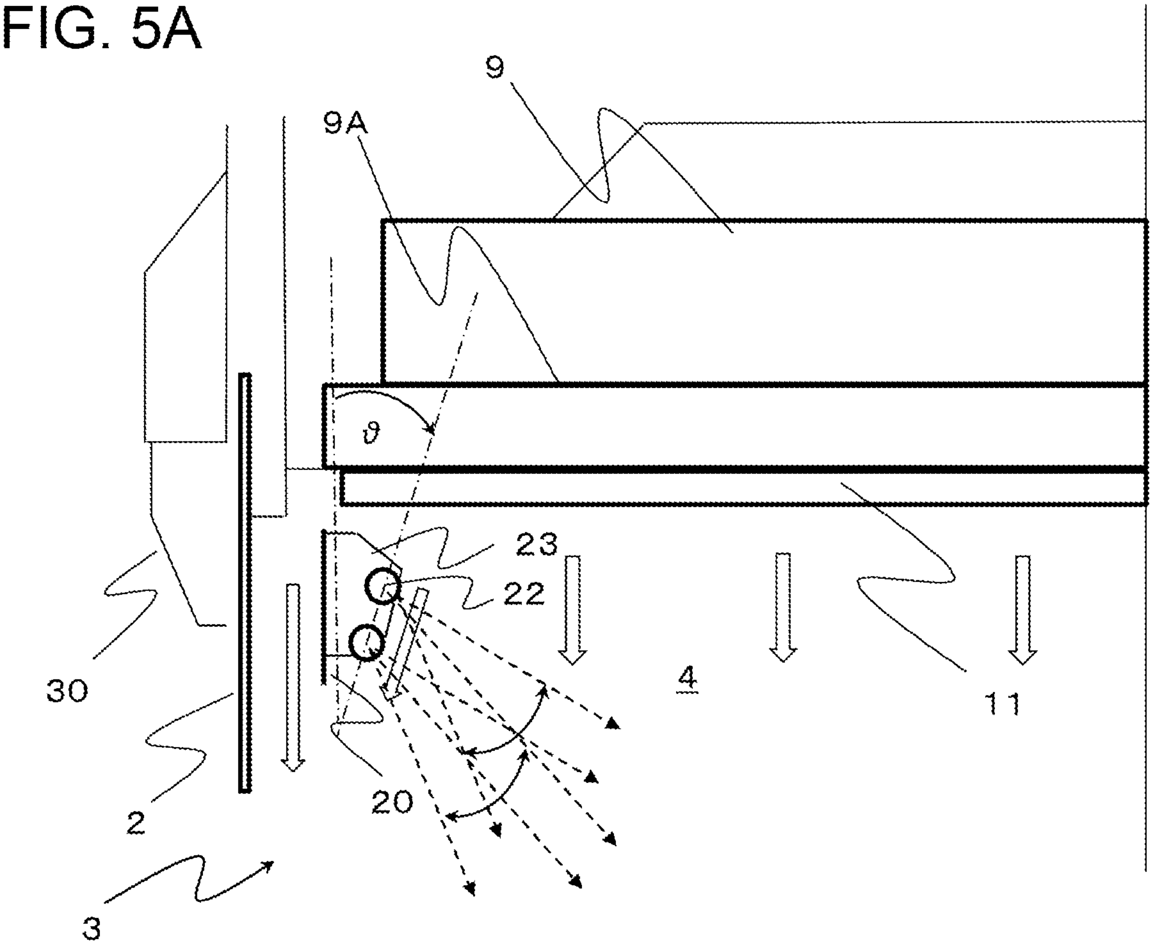
FIGS. 5A and 5B are enlarged views illustrating a part of a safety cabinet of a second embodiment.
Figure 5B:
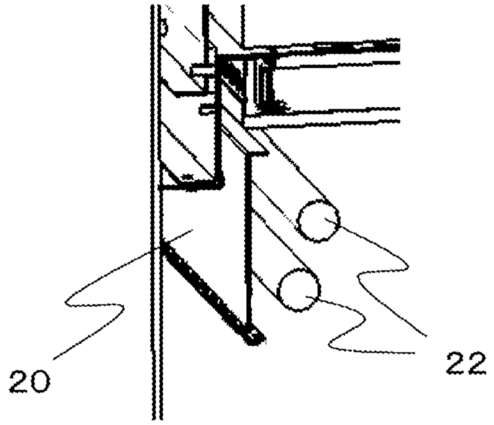

FIG. 5 illustrates an example of a safety cabinet according to a second embodiment of the present invention, FIG. 5(*a*) is a cross-sectional view of the vicinity of the front portion of the work room, and FIG. 5(*b*) is a perspective view thereof.

Although the straightening plate 20 and the linear light source 22 are provided in the second embodiment as well as the first embodiment, a plurality of the linear light sources 22 are provided in the present embodiment. The two linear light sources 22 in the drawings are mounted on the lighting mounting seat 23. Further, the lower linear light source 22 close to the work opening portion 3 is disposed close to the front surface door 2 whereas the upper linear light source 22 far from the work opening portion 3 is away from the front surface door 2. In other words, as illustrated in FIG. 5(*a*), the line segment connecting the two linear light sources 22 is disposed at an angle of θ with respect to the front surface door 2.

Although air is blown from above to the two linear light sources 22, the air flow is drawn into the wall surface of the linear light source 22 as well as the straightening plate and the flow velocity increases. Then, an air flow having a horizontal component toward the work opening portion 3 is generated as indicated by the inclined arrow in the drawing.

It should be noted that three or more linear light sources 22 may be provided although two are provided in the drawings. In addition, although the two linear light sources in the drawings are in the same direction in terms of directivity, alternative options include focusing in one place or spreading.

According to the present embodiment, the effect of the first embodiment can be achieved and, further, the inflow of outside air from the work opening portion 3 to the work room 4 can be blocked and sample contamination can be prevented since the linear light source on the lower side (side close to the work opening portion) as one of the plurality of linear light sources is disposed close to the front surface door.

Third Embodiment

Figure 6A:
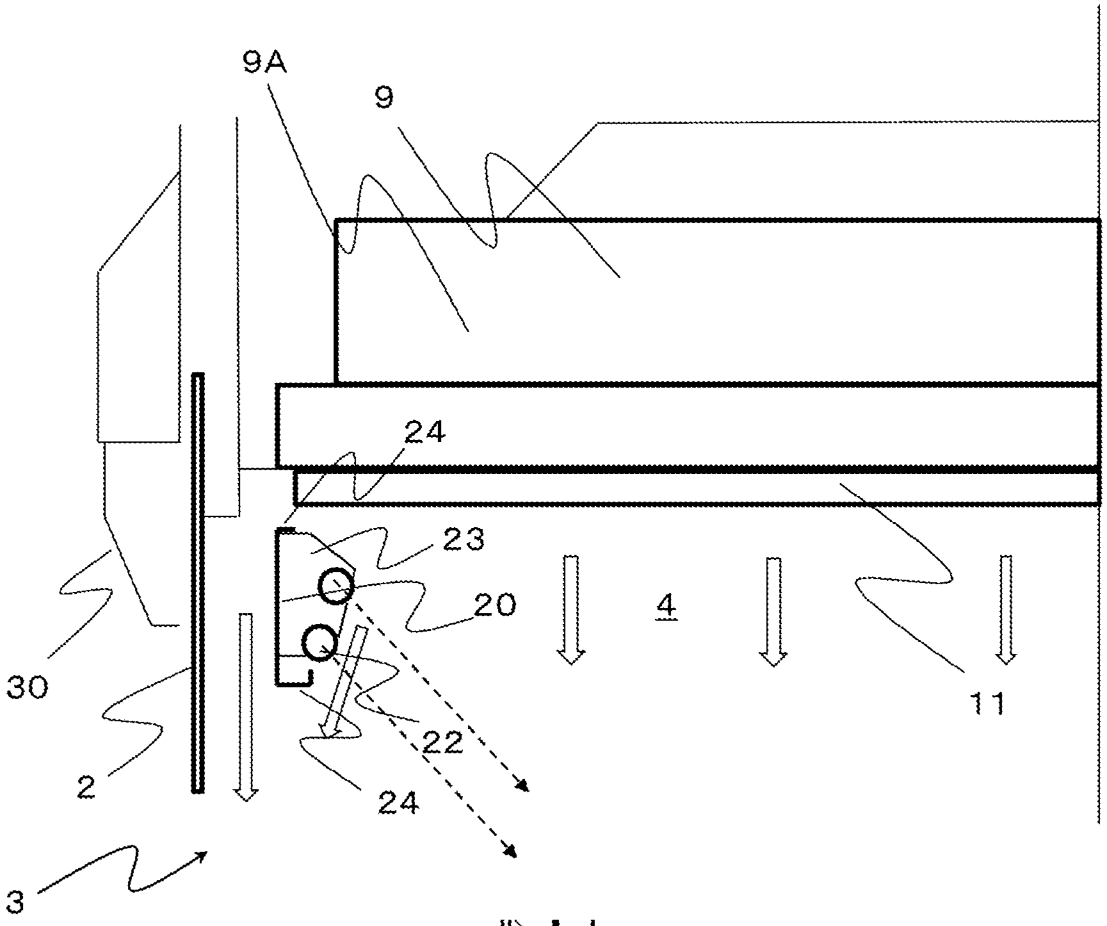
FIGS. 6A and 6B are enlarged views illustrating a part of a safety cabinet of a third embodiment.
Figure 6B:
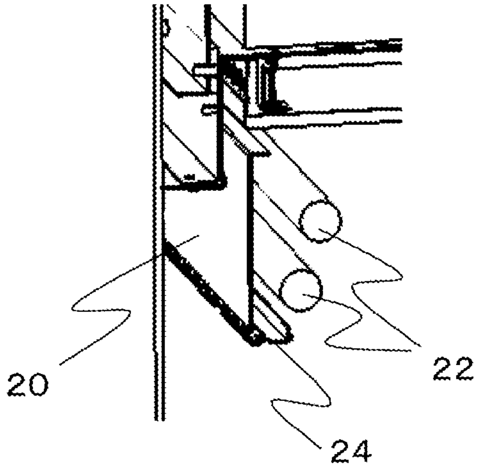

FIG. 6 illustrates an example of a safety cabinet according to a third embodiment of the present invention, FIG. 6(*a*) is a cross-sectional view of the vicinity of the front portion of a work room, and FIG. 6(*b*) is a perspective view thereof.

Although the straightening plate 20 and the plurality of linear light sources 22 are provided in the third embodiment as well as the second embodiment, the straightening plate 20 is reinforced in the present embodiment. In the drawings, an L-shaped bent portion is formed by bending the upper and lower portions of the straightening plate 20 at substantially right angles. Although the straightening plate 20 is configured by a flat plate and easy to bend in the first and second embodiments, the straightening plate can be reinforced by providing an L-shaped and substantially right-angled bent portion 24 above and below the straightening plate 20. It should be noted that the bent portion 24 does not exceed the linear light source 22 in terms of length so as not to hinder the air flow indicated by the arrows and generated by the plurality of linear light sources 22.

According to the present embodiment, the effect of the first embodiment can be achieved and, in addition, the bending of the straightening plate can be suppressed and the strength of the straightening plate can be increased since the L-shaped and substantially right-angled bent portion is provided above and below the straightening plate.

Fourth Embodiment

Figure 7A:
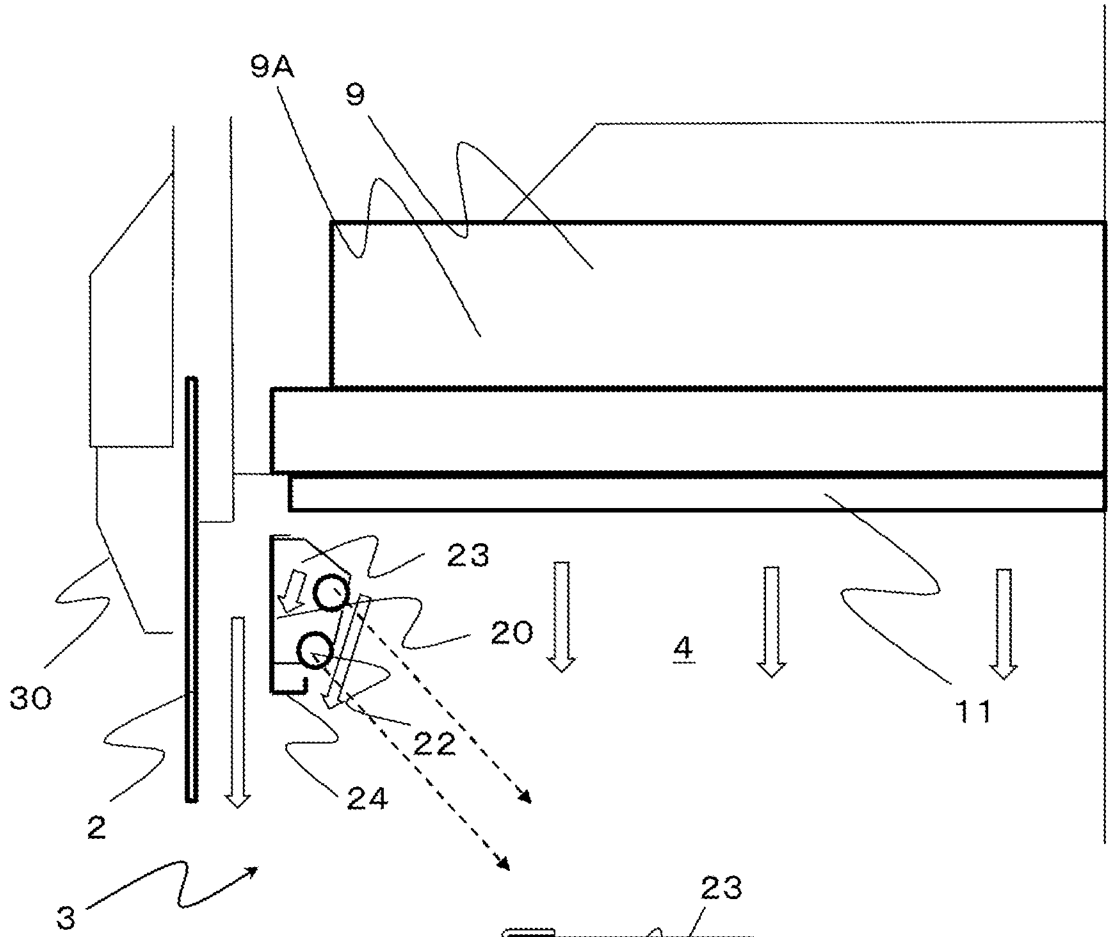
FIGS. 7A and 7B are enlarged views illustrating a part of a safety cabinet of a fourth embodiment.
Figure 7B:
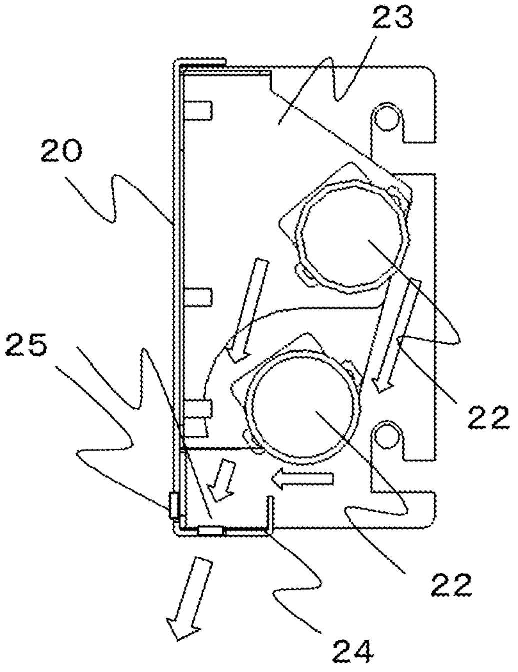

FIG. 7 illustrates an example of a safety cabinet according to a fourth embodiment of the present invention, FIG. 7(*a*) is a cross-sectional view of the vicinity of the front portion of a work room, and FIG. 7(*b*) is an enlarged view thereof.

Although the straightening plate 20 is provided with the bent portion 24 in the present embodiment as well as the third embodiment, the flow of air by the bent portion 24 of the straightening plate is improved in the present embodiment. In FIG. 7(*b*), a slit 25 is formed in the L-shaped bent portion 24 in the lower portion of the straightening plate 20. As illustrated in the drawing, the air in the bent portion 24 of the straightening plate 20 is capable of escaping downward through the slit 25 and an air flow having a horizontal component toward the work opening portion 3 is generated. It should be noted that a slit may be provided in the vicinity of the bent portion 24 of the straightening plate 20 as well as illustrated in the drawing.

According to the present embodiment, the slit is provided in the L-shaped bent portion in the lower portion of the straightening plate. Accordingly, the effect of the first embodiment can be achieved and, in addition, the bending of the straightening plate can be suppressed, the strength of the straightening plat can be increased, the inflow of outside air from the work opening portion into the work room can be further blocked, and sample contamination can be prevented.

Fifth Embodiment

Figure 8A:
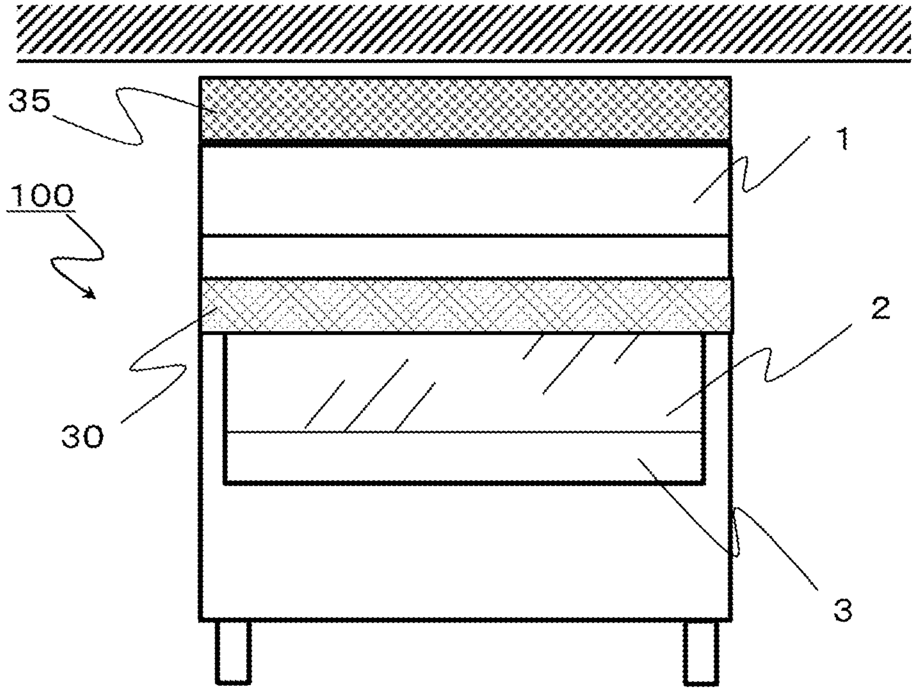
FIG. 8A is a front view of a safety cabinet of a fifth embodiment.
Figure 8B:
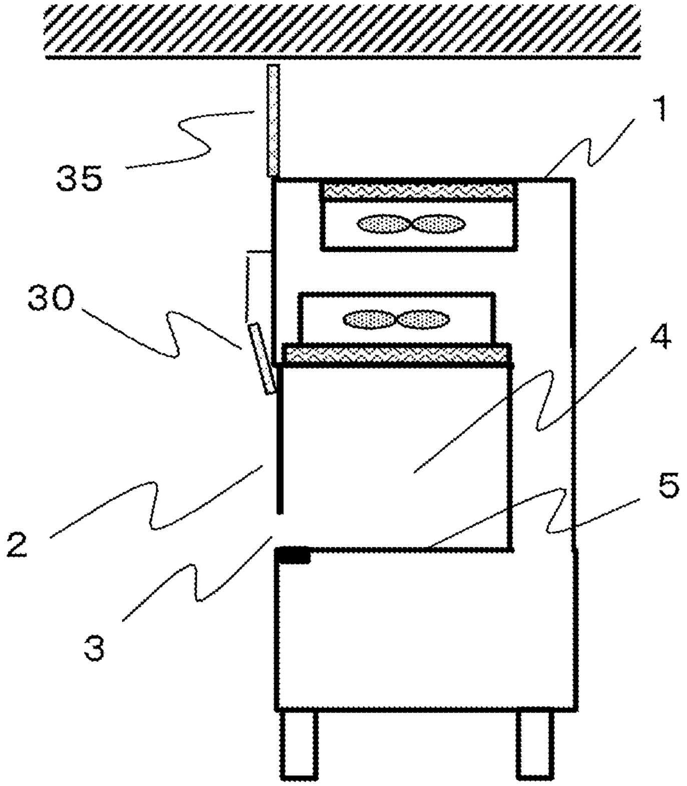
FIG. 8B is a side cross-sectional view of the safety cabinet of the fifth embodiment.

FIG. 8A illustrates a front view of a safety cabinet of a fifth embodiment of the present invention, and FIG. 8B illustrates a cross-sectional view of the safety cabinet as viewed from the right side.

In a case where a worker's head, clothes, or the like is dirty, dust may flow into the work room and contaminate the sample in the work room. The present embodiment is to allow a worker to check his or her clothes or the like in advance.

As illustrated in the drawings, a decorative cover 30 installed in front of a worker is made of mirror-finished stainless steel. As a result, the area around the face, clothes, and so on, where the risk of dust generation is high, can be checked before work. In addition, the feeling of oppression of the apparatus can be reduced by specular reflection.

In addition, the feeling of oppression of the apparatus can be reduced by a curtain plate 35 for filling the gap between the safety cabinet and an indoor ceiling surface being made of mirror-finished stainless steel.

REFERENCE SIGNS LIST

1 Housing
2 Front surface door
3 Work opening portion
4 Work room
5 Workbench
7 Intake port
8 Back flow path
9 Circulation fan
9A Circulation HEPA filter
10 Exhaust fan
10A Exhaust HEPA filter
11 Punching plate
20 Straightening plate
22 Linear light source
23 Lighting mounting seat
24 Bent portion
25 Slit
30 Decorative cover
35 Curtain plate
100 Safety cabinet

The invention claimed is:

1. A safety cabinet comprising:
   - a work room;
   - a front surface door covering a part of a front opening portion of the work room;
   - a work opening portion on a lower side of the front surface door allowing a worker to work with his or her hand in; and
   - an intake port suctioning air in the work room and outside air through the work opening portion on a front surface side of a workbench in a lower portion of the work room,
   - wherein a straightening plate drawing an air flow is provided on the work room side of the front surface door and above a front portion of the work room; and
   - wherein a decorative plate for filling a gap between the safety cabinet and an indoor ceiling surface is made of mirror-finished stainless steel.

2. The safety cabinet according to claim 1, further comprising a linear light source above the front portion of the work room.

3. The safety cabinet according to claim 2, comprising a plurality of the linear light sources, wherein the linear light source on a side close to the work opening portion as one of the plurality of linear light sources is disposed so as to be closer to the front surface door than the linear light source on a side far from the work opening portion.

4. The safety cabinet according to claim 2, wherein the linear light source is mounted on a side wall of the work room by a lighting mounting seat.

5. The safety cabinet according to claim 4, wherein the lighting mounting seat and the straightening plate are integrated.

6. The safety cabinet according to claim 2, wherein the linear light source is a straight tube-type LED lighting lamp.

7. The safety cabinet according to claim 3, wherein the straightening plate is provided with an L-shaped bent portion in at least one of upper and lower portions.

8. A safety cabinet comprising:

a work room;

a front surface door covering a part of a front opening portion of the work room;

a work opening portion on a lower side of the front surface door allowing a worker to work with his or her hand in;

an intake port suctioning air in the work room and outside air through the work opening portion on a front surface side of a workbench in a lower portion of the work room; and a linear light source above the front portion of the work room;

wherein a straightening plate drawing an air flow is provided on the work room side of the front surface door and above a front portion of the work room;

comprising a plurality of the linear light sources, wherein the linear light source on a side close to the work opening portion as one of the plurality of linear light sources is disposed so as to be closer to the front surface door than the linear light source on a side far from the work opening portion;

wherein the straightening plate is provided with an L-shaped bent portion in at least one of upper and lower portions; and wherein the bent portion in the lower portion of the straightening plate is provided with a slit through which air passes.

9. The safety cabinet according to claim 1, wherein a decorative cover installed in front of the worker is made of mirror-finished stainless steel.

* * * * *